US010768718B2

(12) United States Patent
Hardie-Bick et al.

(10) Patent No.: US 10,768,718 B2
(45) Date of Patent: *Sep. 8, 2020

(54) TOUCH SENSOR

(71) Applicant: Anthony Richard Hardie-Bick, London (GB)

(72) Inventors: Anthony Richard Hardie-Bick, London (GB); Clive Kenneth Griffiths, Reading (GB)

(73) Assignee: Anthony Richard Hardie-Bick, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/467,588

(22) PCT Filed: Nov. 1, 2018

(86) PCT No.: PCT/GB2018/000139
§ 371 (c)(1),
(2) Date: Jun. 7, 2019

(87) PCT Pub. No.: WO2019/086824
PCT Pub. Date: May 9, 2019

(65) Prior Publication Data
US 2020/0050289 A1   Feb. 13, 2020

Related U.S. Application Data

(63) Continuation-in-part of application No. 16/142,700, filed on Sep. 26, 2018, now Pat. No. 10,345,960, (Continued)

(30) Foreign Application Priority Data

Feb. 5, 2017   (GB) .................................. 1701877.1
Nov. 3, 2017   (GB) .................................. 1718258.5
Nov. 3, 2017   (GB) .................................. 1718267.6

(51) Int. Cl.
*G06F 3/033*   (2013.01)
*G09G 5/08*   (2006.01)
(Continued)

(52) U.S. Cl.
CPC ............ *G06F 3/0346* (2013.01); *G06F 3/017* (2013.01); *G06F 3/04815* (2013.01); *G06F 3/04883* (2013.01); *G06F 2203/0384* (2013.01)

(58) Field of Classification Search
CPC ............ G06F 2203/0384; G06F 3/017; G06F 3/0346; G06F 3/04815; G06F 3/04883
See application file for complete search history.

(56) References Cited

U.S. PATENT DOCUMENTS 6,891,527 B1 *   5/2005   Chapman .............. G06F 3/0346
345/158
2004/0166912 A1   8/2004   Stienstra
(Continued)

FOREIGN PATENT DOCUMENTS

EP   3086208 A1   10/2016
EP   3190483 A1   7/2017
(Continued)

OTHER PUBLICATIONS http://lauralahti.com/The-Smartball.

*Primary Examiner* — Insa Sadio
(74) *Attorney, Agent, or Firm* — Richard M. Goldberg

(57) ABSTRACT

A spherical input device 105 for navigating a virtual environment 102 is activated for touch sensitivity at any point on its surface 801 by a capacitive touch sensor 709 that includes first and second capacitance-sensing elements 710 and 711. A first variable capacitance 806 is formed between a first capacitance-sensing element and a first area of the user's hands through a first hemisphere 802. A second variable capacitance 807 is formed between a second capacitance-
(Continued)

sensing element and a second area of the user's hands through the second hemisphere 803. A touch-responsive capacitance 805 includes the first variable capacitance in series with the second variable capacitance. Gestural data is derived from the touch-responsive capacitance and device rotations, and transmitted in gestural radio signals 108 to a receiver 109. One or both of the capacitance-sensing elements is configured to minimize attenuation of the gestural radio signals passing through the surface.

20 Claims, 15 Drawing Sheets

Related U.S. Application Data which is a continuation-in-part of application No. 15/886,310, filed on Feb. 1, 2018, now abandoned.

(51) Int. Cl.
*G06F 3/0346* (2013.01)
*G06F 3/01* (2006.01)
*G06F 3/0481* (2013.01)
*G06F 3/0488* (2013.01)

(56) References Cited

U.S. PATENT DOCUMENTS

| | | |
|---|---|---|
| 2011/0074700 A1 | 3/2011 | Sharp |
| 2012/0154267 A1 | 6/2012 | Albano et al. |
| 2012/0223909 A1 | 9/2012 | Tse et al. |
| 2013/0027299 A1 | 1/2013 | Tsukahara et al. |
| 2013/0147743 A1 | 6/2013 | Ludwig |
| 2014/0362025 A1 | 12/2014 | Sesto et al. |
| 2015/0054633 A1 | 2/2015 | Saddik et al. |
| 2015/0097774 A1 | 4/2015 | Kabasawa et al. |
| 2017/0031502 A1 | 2/2017 | Rosenberg et al. |
| 2017/0269589 A1* | 9/2017 | Clarke ............... A63H 33/005 |

FOREIGN PATENT DOCUMENTS

| | | |
|---|---|---|
| WO | 2005114624 A2 | 12/2005 |
| WO | 2007077124 A1 | 7/2007 |
| WO | 2011011898 A1 | 2/2011 |

\* cited by examiner

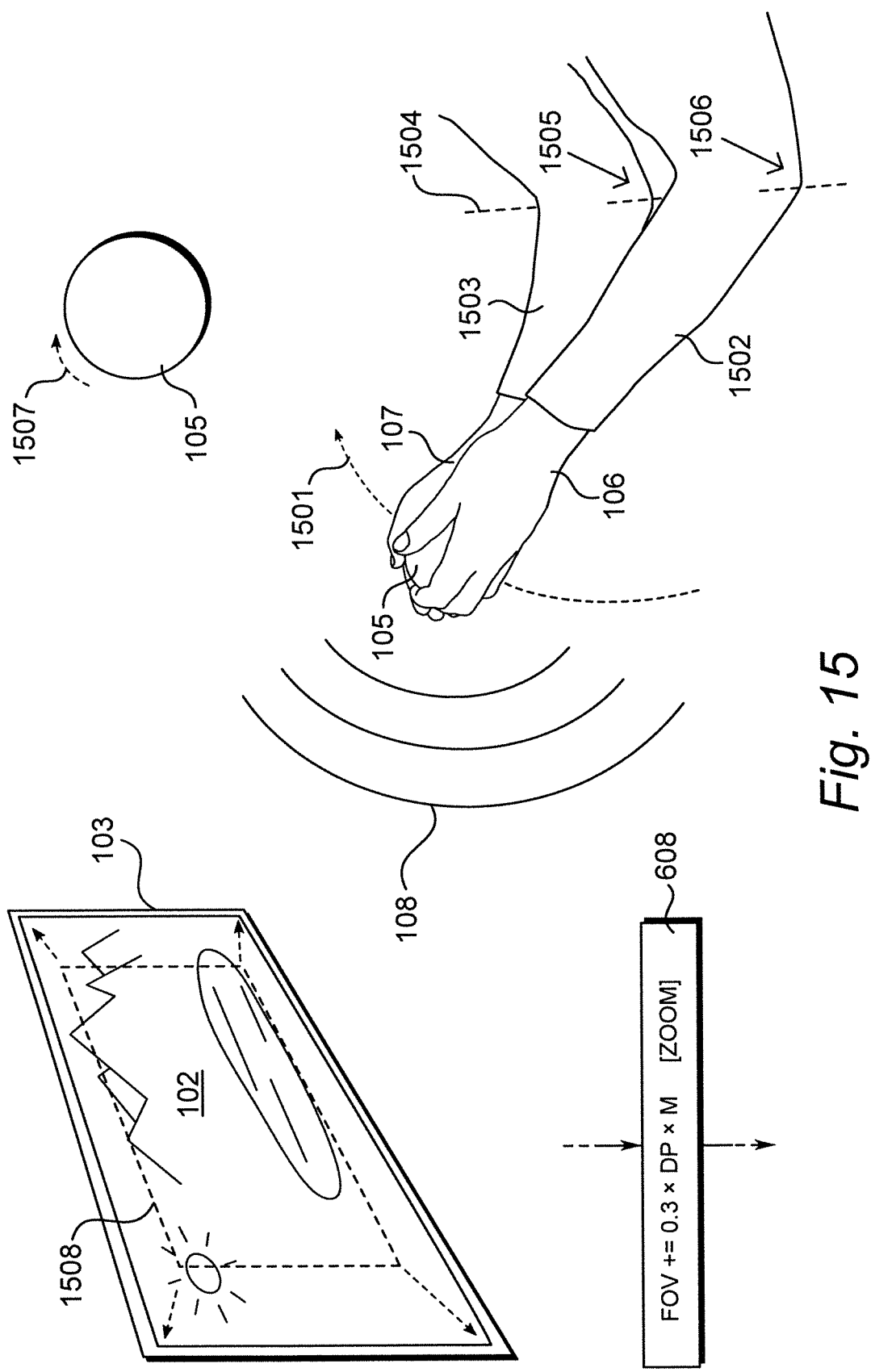

TOUCH SENSOR

CROSS REFERENCE TO RELATED APPLICATIONS

This application represents a continuation-in-part of U.S. patent application Ser. No. 16/142,700 filed on 26 Aug. 2018 and claims priority from UK Patent Application Numbers GB1701877.1 filed on 5 Feb. 2017 and GB1718258.5 filed on 3 Nov. 2017.

BACKGROUND OF THE INVENTION

1. Field of the Invention

The present invention relates to transmitting data wirelessly, and in particular relates to transmitting data from within an enclosed touch sensing surface of a spherical input device.

2. Description of the Related Art

The computer mouse revolutionized desktop computing, and the touch screen subsequently revolutionized mobile computing. These two types of input system highlight the importance of user input devices, and demonstrate their ability to transform advanced technologies from expensive scientific tools into low cost everyday items. In spite of diverse research efforts, there is no standard input device for navigating three-dimensional virtual environments. Virtual worlds are presented with increasingly high quality due to the decreasing cost of graphics processors, which are subject to Moore's law. Displays more than a meter across are commonplace consumer products. However, virtual environments displayed on them must be navigated using a joystick, or a mouse and keyboard, or using any one of several input technologies specialized for a particular application.

Examples of virtual environments include many kinds of computer games, three-sixty degree videos and photographs. Anyone with a web browser can, in theory, rotate, zoom and otherwise navigate these immersive experiences using a keyboard and mouse. However, this method of navigation is very cumbersome. Similarly, a smartphone can be used to view three-sixty videos by holding the device in the air and rotating it as if it were a virtual window. This viewing method is tolerable for less than a minute, and serves primarily as a technology demonstrator.

One attempt to make virtual environments more comfortable is to use a virtual reality headset, which replaces most of the user's field of view with a pair of synthetic images, one for each eye. Head movements are tracked so that the images supplied to each eye are updated as if the user is actually in the virtual environment. Although the sense of immersion can be profound, it is easily broken when moving around the environment. Furthermore, a headset isolates the user off from their immediate physical surroundings. User movement in any kind of three-dimensional virtual environment lacks a widely accepted universal input device analogous to the mouse or touch screen. This problem exists regardless the type of display system used.

In U.S. Pat. No. 6,891,527 B1 a hand-supported sphere is proposed as a universal input device. Passive acoustics are used to track the movement of a fingertip across the sphere's surface. The passive acoustic sensor aims to solve a particular problem: When using the sphere for input, it is rotated arbitrarily. Therefore, the entire surface must be homogeneously activated for touch detection, otherwise touch events would rotation-dependent. The touch-sensitive spherical surface encloses a radio transmitter that transmits gesture data to an external processing system. The problem solved by U.S. Pat. No. 6,891,527 B1 is that a resistive or capacitive touch-sensing matrix would act as a Faraday cage, significantly attenuating radio transmissions from the input device. However, passive acoustics does not have this problem, although the vocabulary of gestures that can be detected with this system is limited.

Spherical input devices have been subsequently disclosed in US 2012/0154267 A1, US 2013/0027299 A1, US 2015/0054633 A1, US 2015/0097774 A1, WO2007/077124 A1, and EP 3 190 483 A1. These documents describe freely-held spherical input devices that include one or more pressure sensors for detecting a force applied by squeezing the surface. The pressure sensors are sparsely located, avoiding the need to transmit radio signals through the conductive matrix of a resistive or capacitive touch sensor that fully covers the surface. However, this gives the devices a relatively limited gestural vocabulary. In WO 2011/011898 A1 and https://lauralahti.com/The-Smartball, a freely held spherical input device is described, but these documents do not address the technical problem of providing a touch sensor that fully covers a spherical surface.

In WO 2005/114624 A2, US 2011/0074700 A1 and US 2014/0362025 A1, spherical input devices are disclosed. Included in these disclosures are indications that a capacitive touch sensing surface can be used for touch detection. However, details of capacitive touch sensor construction are not provided, and the problem of the Faraday cage is not identified. Known systems do not show how a homogeneous capacitive touch sensor can be implemented on a spherical input device, while ensuring reliable radio communication.

BRIEF SUMMARY OF THE INVENTION

According to a first aspect of the present invention, there is provided an apparatus for data input comprising a substantially spherical touch-sensitive outer surface arranged to be supported within the hands of a user, a capacitive touch sensor, including a plurality of capacitance-sensing elements configured to generate surface touch signals in response to a touch-responsive capacitance including a first variable capacitance in series with a second variable capacitance, a first capacitance-sensing element arranged to establish the first variable capacitance with a first area of the user's hands through a first hemisphere of the outer surface, a second capacitance-sensing element arranged to establish the second variable capacitance with a second area of the user's hands through the respective second hemisphere of the outer surface, an inertial measurement unit arranged to generate rotation signals in response to rotational manipulations of the outer surface by the user, a device processor for generating gestural data in response to the surface touch signals with the rotation signals, and a radio transmitter for generating gestural radio signals from the gestural data and transmitting the gestural radio signals through the outer surface. Preferably the first capacitance-sensing element is substantially transparent to the gestural radio signals. Preferably the first capacitance-sensing element is a spiral-shaped conductor substantially enclosing the volume of the first hemisphere.

According to a second aspect of the present invention there is provided a method of inputting data using a substantially spherical outer surface supported within the hands of a user, the outer surface enclosing a touch sensor, an inertial measurement unit, a device processor and a radio transmitter, the method comprising the steps of forming a first variable capacitance between a first capacitance-sensing element of the touch sensor and a first area of the user's hands through a first hemisphere of the outer surface, forming a second variable capacitance between a second capacitance-sensing element of the touch sensor and a second area of the user's hands through the respective second hemisphere of the outer surface, measuring a touch-responsive capacitance that includes the first variable capacitance in series with the second variable capacitance to generate surface touch signals, generating rotation signals in response to a rotational manipulation of the outer surface detected by the inertial measurement unit, processing the surface touch signals with the rotation signals to generate gestural data, supplying the gestural data to the radio transmitter to generate gestural radio signals, and transmitting the gestural radio signals through the outer surface. Preferably the transmitting step includes transmitting the gestural radio signals through the first capacitance-sensing element.

According to another aspect of the present invention, there is provided a method of updating a virtual environment using a substantially spherical input device having an outer surface supported within the hands of a user, comprising the steps of forming a first variable capacitance between a first capacitance-sensing element and a first area of the user's hands through a first hemisphere of the outer surface, forming a second variable capacitance between a second capacitance-sensing element and a second area of the user's hands through the respective second hemisphere of the outer surface, measuring a touch-responsive capacitance indicative of the area of the user's hands contacting the outer surface that includes the first variable capacitance in series with the second variable capacitance, comparing an indication of the area of the user's hands contacting the outer surface with a threshold, analyzing a rotational manipulation of the outer surface to generate a rotation indication, and processing the comparison with the rotation indication to update a virtual environment.

BRIEF DESCRIPTION OF THE DRAWINGS

FIG. 15 shows a zoom gesture performed using the system shown in FIG. 1.

BRIEF DESCRIPTION OF EXAMPLE EMBODIMENTS

FIG. 1

Figure 1:
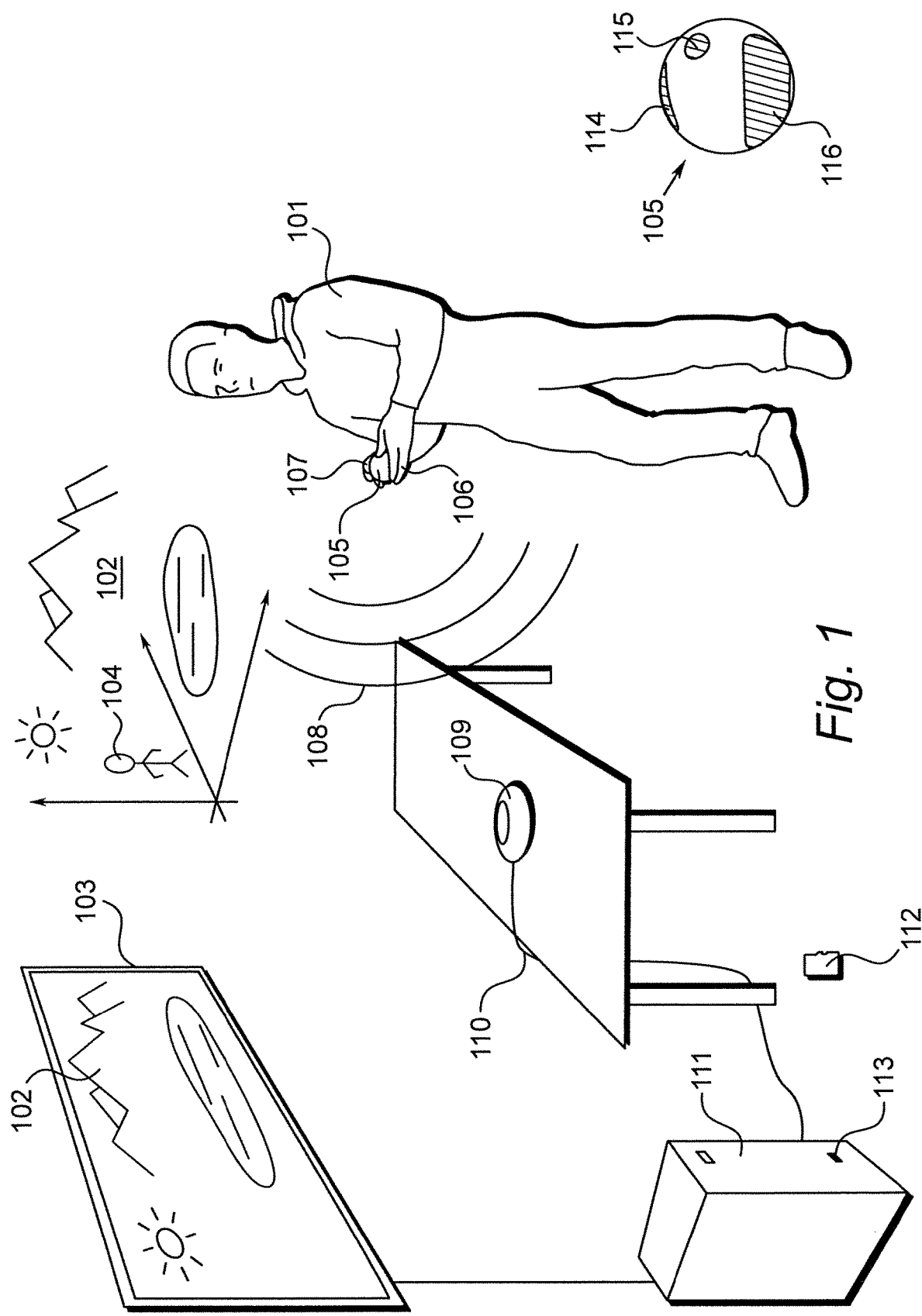
FIG. 1 shows a system for navigating a virtual environment, including an input device and a processing system.

A system for navigating a virtual environment in response to user input is shown in FIG. 1. A user 101 views a virtual environment 102 shown on a display 103. The user's viewpoint 104 in the virtual environment 102 is adjusted by user manipulation of a spherical input device 105, which provides manual data input. The input device 105 is supported and manipulated by the user's left and right hands, 106 and 107. The input device 105 may be operated with one or two hands, and the following description will be understood as including single-handed operation when referring to the user's hands 106 and 107. The input device 105 transmits gestural radio signals 108 to a receiver 109. The receiver also acts as a wireless charger for the device 105 when it is not being used. The receiver 109 is connected by a Universal Serial Bus (USB) cable 110 to a processing system 111 which renders the virtual environment 102 and supplies rendered image data to the display 103.

A flash memory card 112 provides a computer-readable medium that stores instructions for the processing system 111, the receiver 109 and the input device 105. The instructions are installed by connecting the memory card 112 to the processing system 111 via a memory card socket 113. The input device 105 detects user manipulations including rotations, and has a touch-sensitive surface that detects touched areas 114, 115 and 116 of the input device 105 that are contacting or in close proximity with the hands 106, 107 of the user 101. The touched areas 114, 115 and 116 shown in FIG. 1 are only an example, and it will be understood that the entire spherical surface of the input device 105 is substantially homogeneously touch sensitive. From the point of view of the user 101, this allows the same touch events to be detected equally, regardless the particular orientation of the device 105. Furthermore, the input device 105 has no orientation markings that require the user to place the device in a specific orientation during use. In an embodiment, the device 105 has a discernible equator, that results from manufacture, and also includes light-emitting diodes to provide charging indications and so on, but these features do not affect navigation of the virtual environment 102.

The input device 105 can be used to adjust or move the user's viewpoint 104 in the virtual environment 102 and may also be used at other times to navigate a menu system shown on the display 103 to select different virtual environments or features. In an embodiment, the input device 105 is used as a television remote control for selecting programs listed on the display 103 in a graphical or spatial user interface.

FIG. 2

Figure 2:
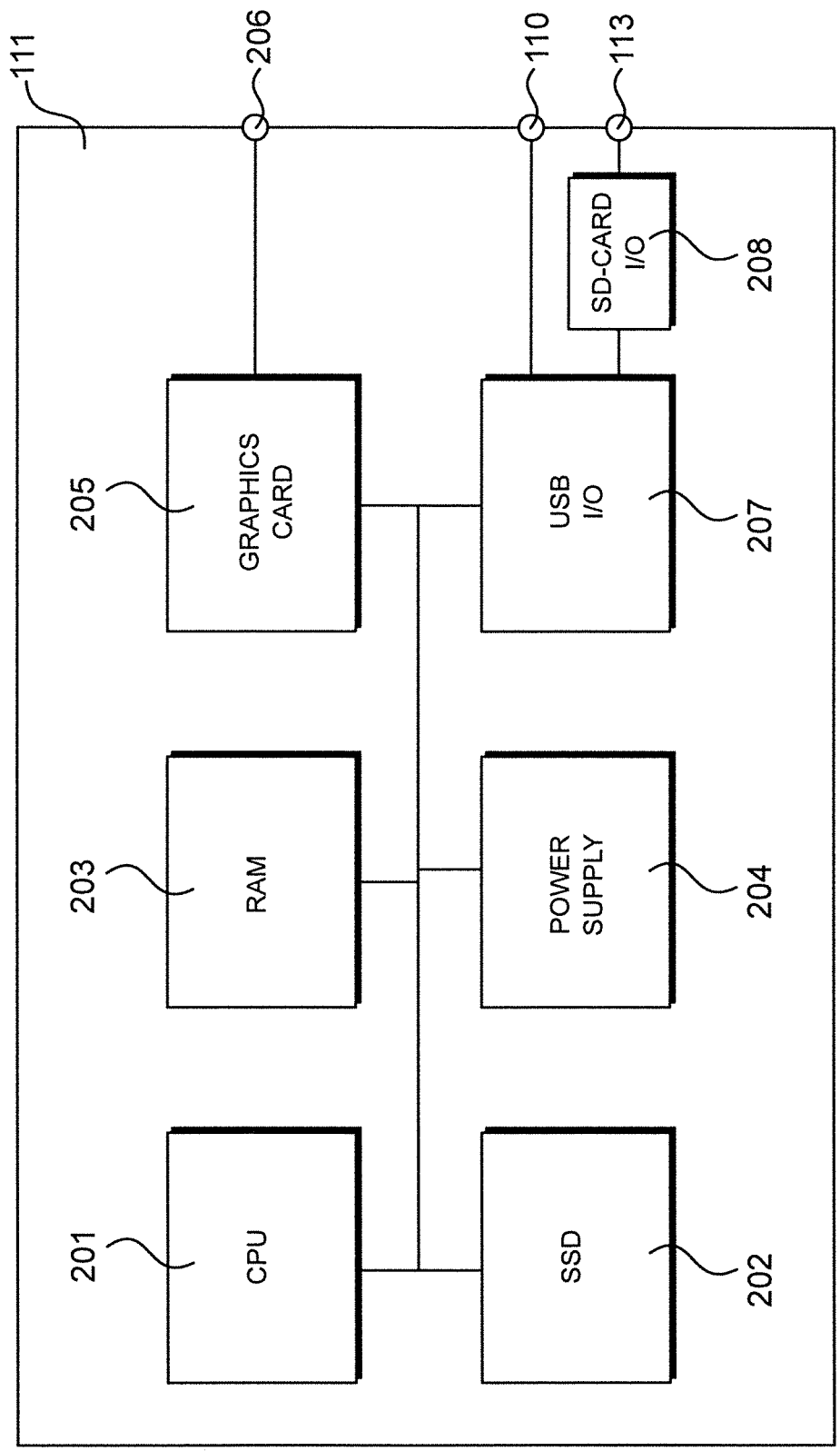
FIG. 2 details components of the processing system shown in FIG. 1, including system memory.

Components of the processing system 111 shown in FIG. 1 are detailed in FIG. 2. A Central Processing Unit (CPU) 201 executes instructions and processes data from a Solid State Disk (SSD) 202, using dynamic Read-And-write Memory (RAM) 203 for caching and temporary storage. A power supply 204 supplies regulated power to each of the components of the processing system 111. A graphics card 205 includes a Graphics Processing Unit (GPU) for parallel rendering of the virtual environment 102, and which generates image data supplied to the display 103 via a digital video connection 206. A USB Input and Output (I/O) circuit 207 provides a connection to external devices, including the connection 110 made with the receiver 109. A memory card interface 208 provides connectivity for the flash memory card 112 shown in FIG. 1, via the memory card socket 113.

FIG. 3

Figure 3:
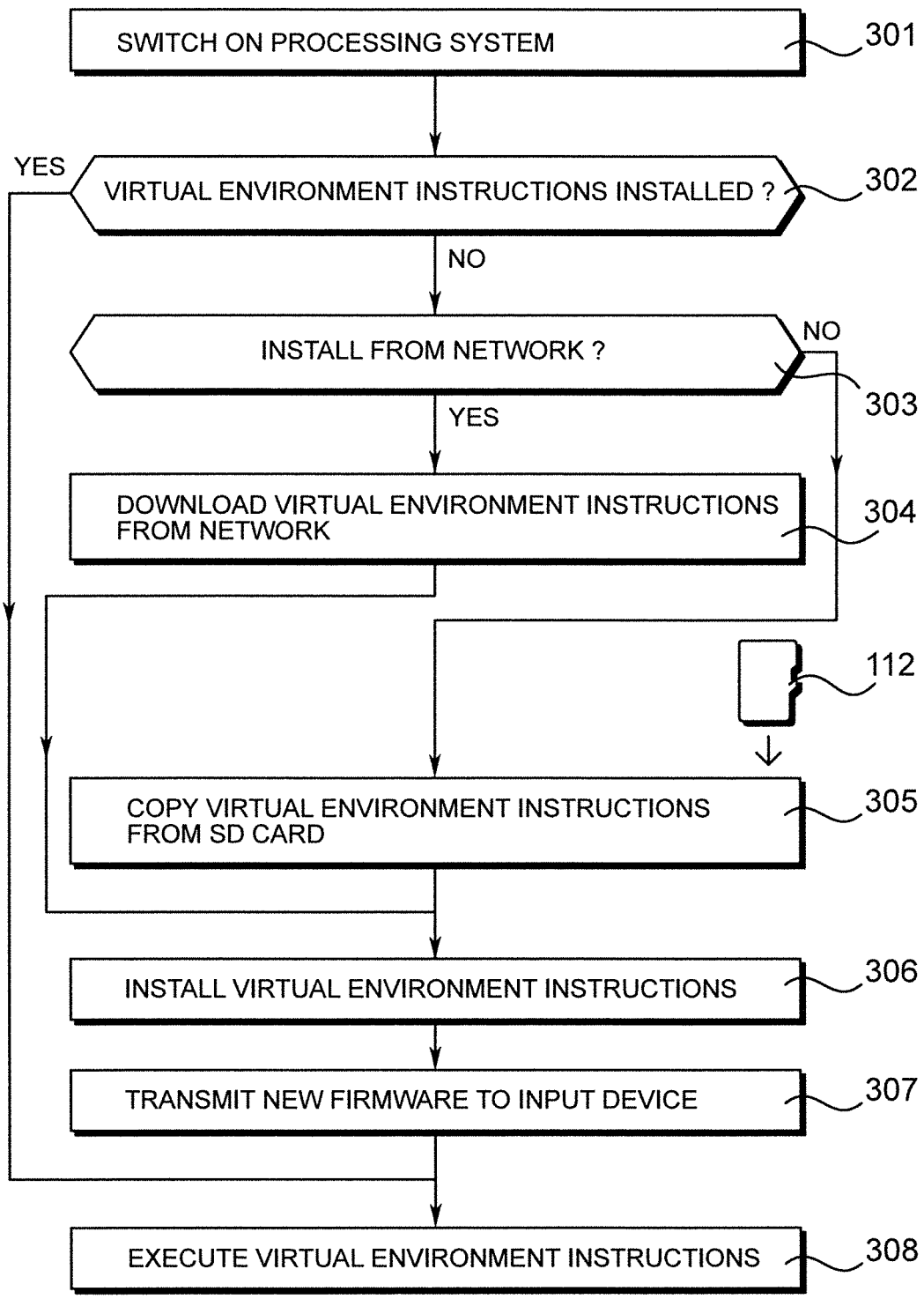
FIG. 3 summarizes the steps performed when operating the processing system shown in FIG. 1, including a step of executing virtual environment instructions.

Steps for operating the processing system 111 shown in FIG. 1 are summarized in FIG. 3. At step 301 the processing system 111 is switched on. At step 302 a question is asked as to whether virtual environment instructions have been installed. If not, control is directed to step 303, where a question is asked as to whether to install the instructions from a network, such as the Internet. Network download is performed at step 304. Alternatively, instructions are copied from the memory card 112 at step 305. At step 306 the virtual environment instructions are decompressed, authenticated and installed on the processing system 111. At step 307, new firmware instructions installed on the processing system 111 are transferred via the USB cable 110 to the receiver 109. At step 307 new firmware is transmitted by radio from the receiver 109 to the input device 105. At step 308, virtual environment instructions are executed.

FIG. 4

Figure 4:
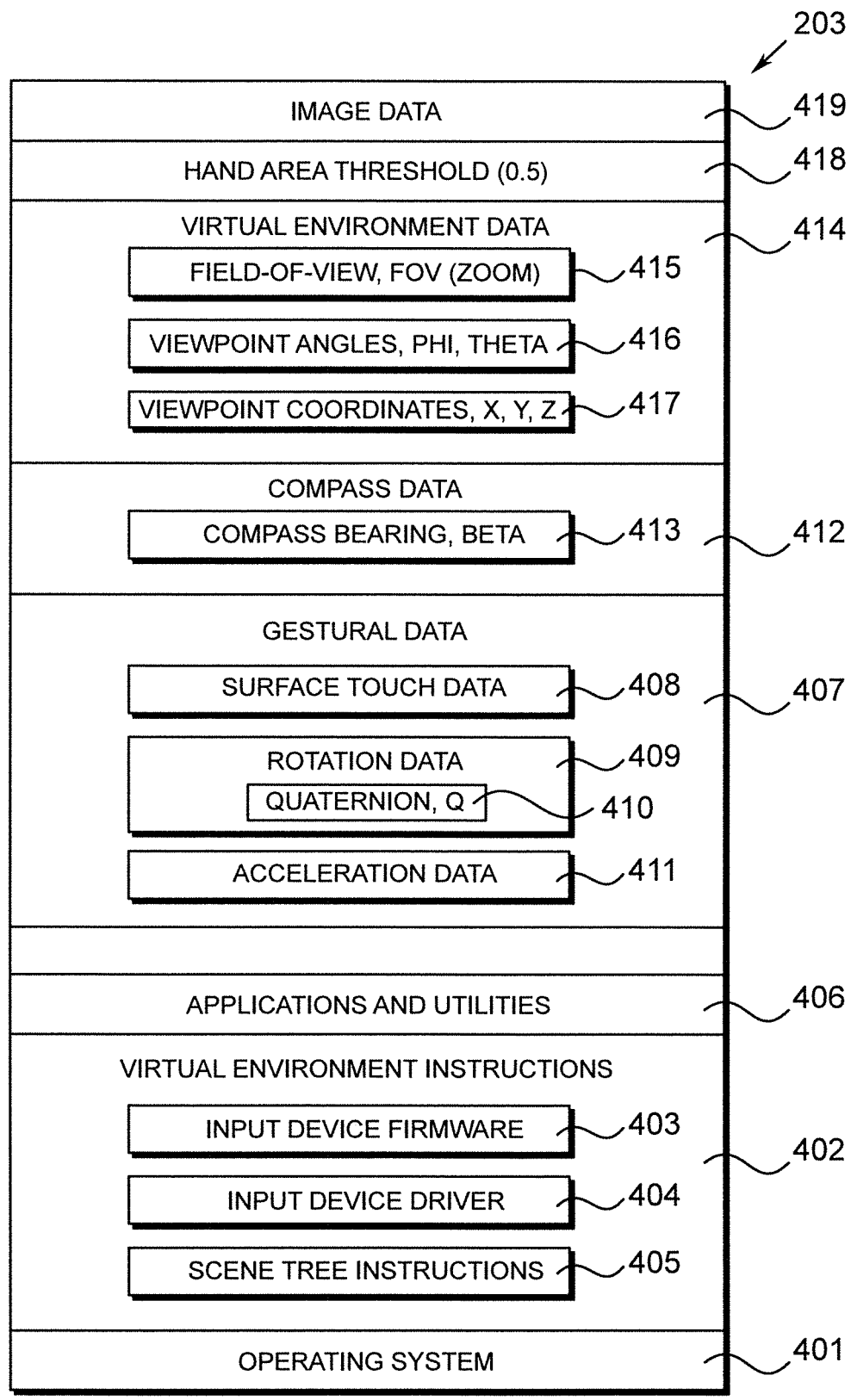
FIG. 4 details the contents of system memory shown in FIG. 2.

As a result of the steps shown in FIG. 3, the contents of the processing system's RAM 203 shown in FIG. 2 are as shown in FIG. 4. An operating system 401 provides hardware abstraction and process management. Input device instructions 402, installed at step 306 in FIG. 3, include input device firmware 403, an input device driver 404 and scene tree rendering instructions 405. The input device firmware 403 is supplied to the input device 105 via the receiver 109, to provide firmware instructions for detecting rotations of the input device 105 and to detect areas 114, 115 and 116 of the user's hands that are contacting it or in close proximity. The firmware 403 is only required by the input device 105 during manufacture or if its existing firmware is out of date. The input device driver instructions 404 enable the processing system 111 to communicate with the input device 105, and to extract rotation data and surface touch data from gestural data received from it. The scene tree instructions 405 include instructions to generate and render the virtual environment 102 and display it to the user 101 on the display 103.

Data in RAM 203 includes gestural data 407 received from the input device 105. The gestural data 407 includes surface touch data 408, which provides an indication of the hand area in contact or close proximity to the surface of the input device 105. For example, the combined hand areas 114, 115 and 116 shown in FIG. 1 are represented by a single value, indicative of the total area of the user's hands 106 and 107 contacting or in close proximity with the surface of the input device 105. Gestural data 407 further includes rotation data 409, that describes the orientation of the input device 105 using a quaternion, Q, 410. The quaternion, Q, is a vector of four components, defining orientation angles about perpendicular x-, y- and z-axes using three imaginary components i, j and k, plus a real magnitude, w. The quaternion 410 is updated at one hundred and twenty times a second, so that rotational manipulations of the input device 105 result in changing values of the components of the quaternion 410. Input data 407 also includes acceleration data 411, which has x, y and z components that are used to identify non-rotational gestures made with the input device 105, including tapping its surface.

Contents of the memory 203 also include compass data 412. The compass data 203 includes a calibrated geomagnetic compass bearing, BETA, 413, which defines the forward-facing direction of the user 101 in terms of the Earth's geomagnetic field.

Data in RAM 203 further includes virtual environment data 414. This includes all object data, physics models, bitmaps, and so on that are used to define the virtual environment 102. In the preferred embodiment, the virtual environment data 414 includes image data representing a sphere surrounding the user's point-of-view 104. A field-of-view (FOV) 415 defines the angular width of the spherical image shown on the display 103. Typical values for this are ninety degrees. If the FOV is reduced, a smaller area of the encompassing spherical image is displayed, resulting in a zoom in effect. When the FOV is increased, a larger area is displayed, resulting in a zoom out effect.

The direction of the view shown on the display 103 is defined by viewpoint angles 416, including the yaw, defined by a variable PHI, and the pitch, defined by a variable THETA. The yaw is the viewpoint's angle of rotation around a vertical axis through the user's viewpoint 104. The pitch is the viewpoint's angle of rotation about a horizontal left-to-right axis with respect to the user's viewpoint 104. In an embodiment, the virtual environment 102 is generated from a collection of virtual objects, enabling the user's viewpoint 104 to move through the virtual environment 102, requiring viewpoint coordinates 417 to define the location of the user's viewpoint 104. When displaying a virtual environment based on a spherical image or movie, the viewpoint coordinates 417 are not required. A hand area threshold 418 is used to interpret user manipulations of the input device 105, and takes the value of one half, corresponding to approximately half the surface area of the input device 105.

The scene tree instructions 405 process the data shown in FIG. 4 to generate image data 419 that is supplied to the display 103. It will be appreciated that some portion of image rendering will be performed by the GPU of the graphics card 205, and that some or all of the image data will be stored on memory used exclusively by the GPU instead of RAM 203. For the purposes of a clear description, such details will be omitted.

FIG. 5

Figure 5:
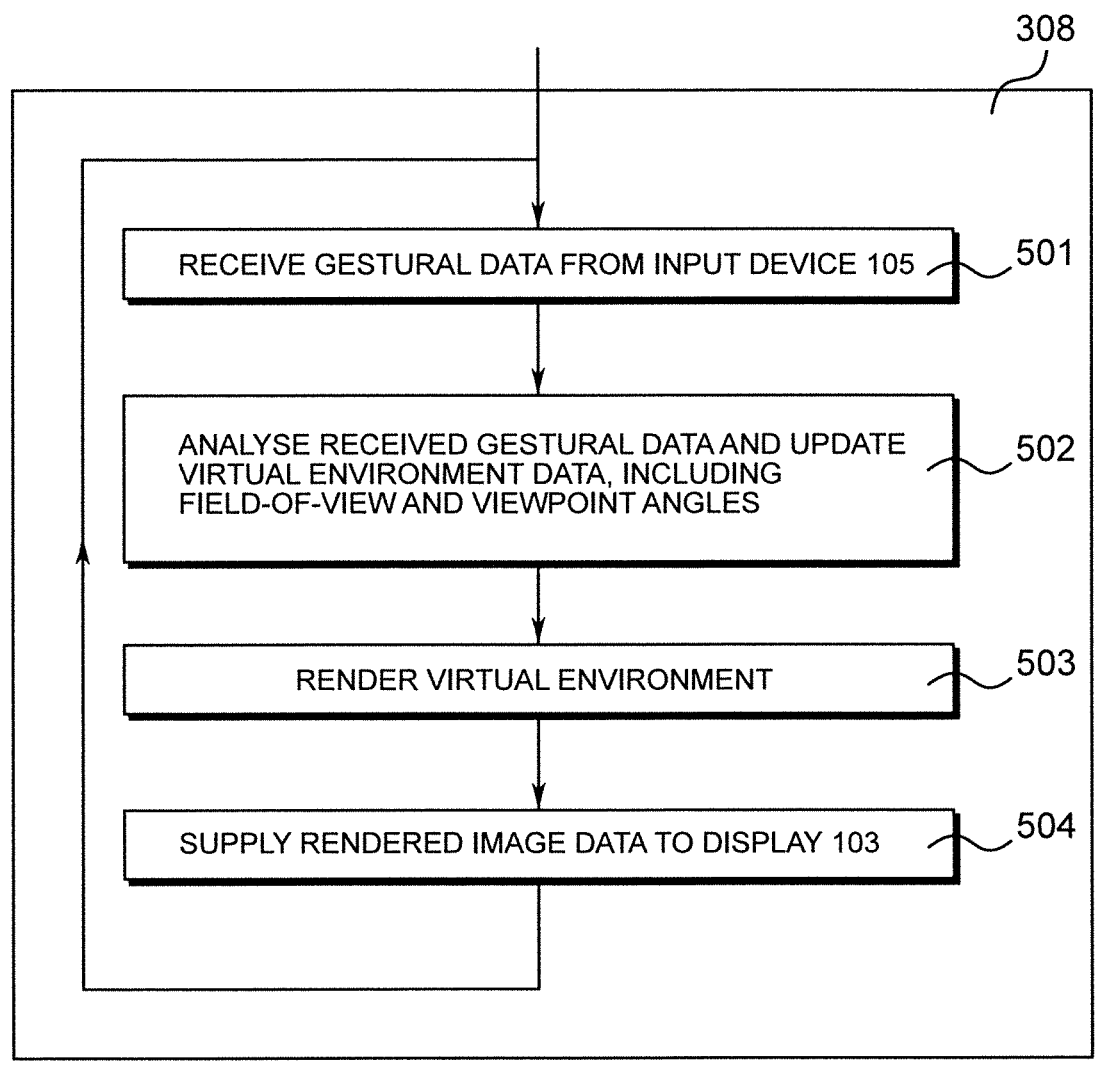
FIG. 5 details the step of executing virtual environment instructions shown in FIG. 3, including a step of analyzing gestural data and updating virtual environment data.

The step 308 of running scene tree instructions 405 is detailed in FIG. 5. At step 501, gestural data 407 is received from the input device 105. At step 502, the received gestural data 407 is analyzed and virtual environment data 414 is updated, including the field-of-view 415 and viewpoint angles 416. At step 503 the virtual environment 102 is rendered, resulting in generation of the next frame of image data 419. At step 504 the image data 419 is supplied to the display 103. The steps of FIG. 5 are repeated at a fixed rate of one hundred and twenty times a second, resulting in smooth and immediate adjustment of the user's view of the virtual environment 102 in response to user manipulation of the input device 105.

FIG. 6

Figure 6:
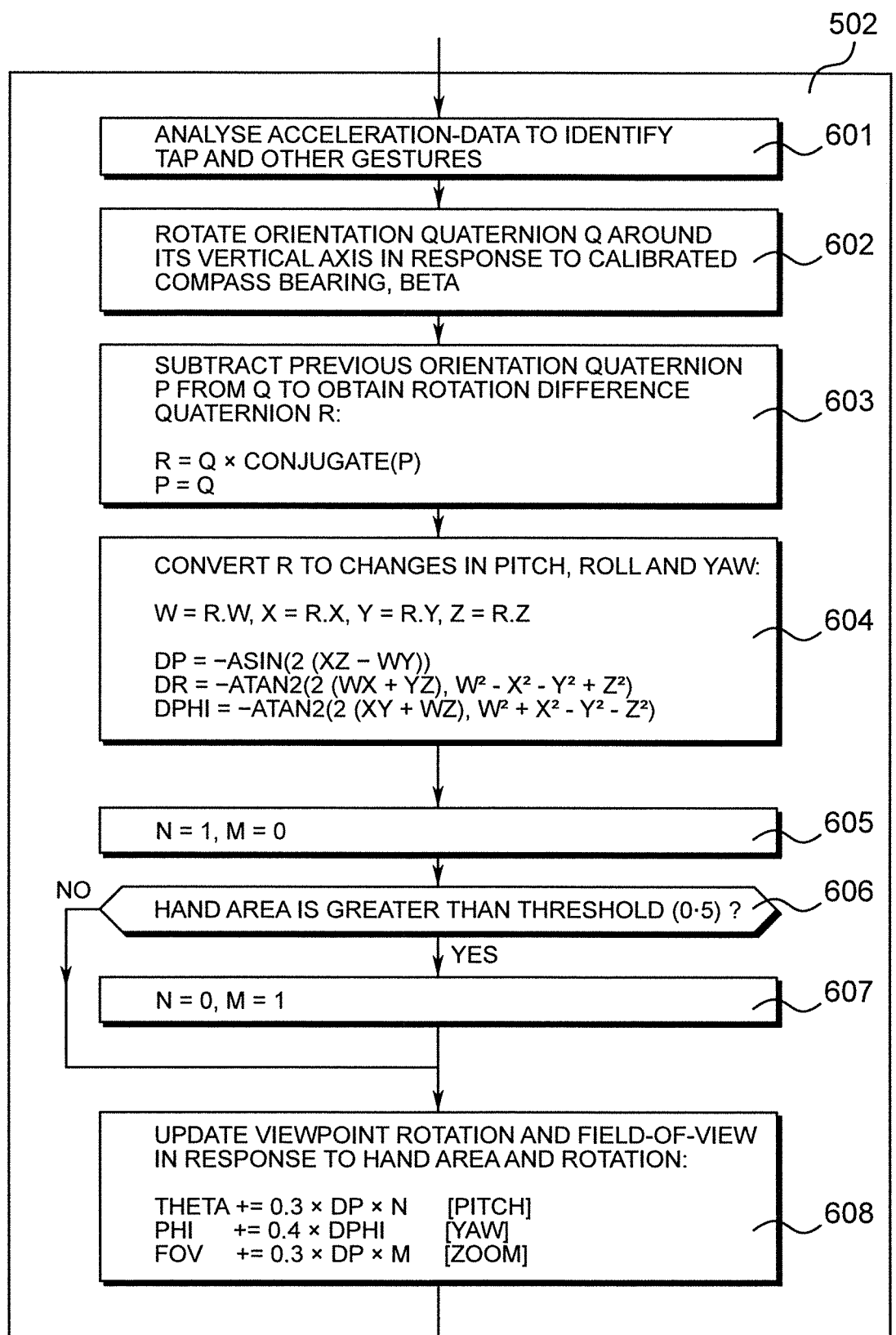
FIG. 6 details the step of of analyzing gestural data and updating virtual environment data shown in FIG. 5.

The step 502 of analyzing gestural data and updating the virtual environment data 414, shown in FIG. 5, is detailed in FIG. 6. At step 601, the acceleration data 411 is analyzed to identify whether the user 101 has tapped the surface of the input device 105. At step 602, the orientation quaternion, Q 410 is rotated around its vertical axis in response to the calibrated compass bearing, BETA, 413. The purpose of this is to interpret user gestures with respect to the display 103. In other words, when the user 101 rolls the input device 105 forwards towards the display 103, the user perceives the view moving downwards in the virtual environment 102 as it is viewed on the display 103.

At step 603, a previous orientation quaternion, P, is subtracted from Q, 410, to obtain a rotation difference quaternion, R. After R has been calculated, the value of Q is copied into P in preparation for the next iteration. A distinction is made between a rotation, which can be a circular movement or a rotational displacement, and an orientation, which is simply a rotational displacement. The orientation quaternion, Q, 410, represents the static condition of the input device at the moment in time when its orientation is measured. The rotation quaternion, R, represents the change in orientation that has occurred over the previous eight milliseconds.

At step 604, the rotation, R, is converted into changes in pitch, roll, and yaw, represented by DP, DR and DPHI respectively. DP is the change in pitch, which is a forward rotation of the input device 105 about a left-to-right horizontal x-axis with respect to the user's forwards direction. DR is the change in roll, which is a lateral roll of the input device 105 about a forward-facing z-axis with respect to the user's sense of direction. DPHI is the change in yaw, which is a rotation of the input device 105 about a vertical y-axis.

At step 605 two variables, N and M, are set to one and zero respectively. At step 606 a question is asked as to whether the surface touch data 408 indicates that the area user's hands touching the input device 105 is greater than the hand area threshold 418. If so, variables N and M are changed to zero and one respectively at step 607.

At step 608, the field-of-view 415 and viewpoint rotation 416 are updated in response to the surface touch data 408 and the device rotation 410. This results in updates of variables THETA, PHI, and FOV. THETA is the pitch angle of the viewpoint 104 about the x-axis with respect to the user's orientation in the virtual environment 102 and PHI is the yaw angle of the viewpoint 104 about the vertical y-axis in the virtual environment 102. The roll component of the user's viewpoint 104 is assumed to be zero, but may be used in an embodiment. Together, THETA and PHI define the angle of the user's viewpoint 104 in the virtual environment 102. THETA is affected by the surface touch data 408, via the setting of variables N and M in response to the hand area threshold 418. If the hand area touching the surface of the input device 405 is less than the threshold 418, THETA is modified in response to DP. Conversely, if the hand area exceeds the threshold 418, FOV is modified in response to DP. Modification of THETA or FOV is scaled by a factor of about one third, so that rotational sensitivity of the input device is reduced, enabling improved controllability. The yaw movement provided by PHI is also scaled, by a slightly larger factor. It will be appreciated that the threshold 418 tested at step 606 may be gradually applied, so that the change between adjusting THETA or FOV is not completely abrupt. In an embodiment, the change between adjusting THETA or FOV is interpolated over a range of one fifth of the maximum hand area, centered on the threshold value 418. A hand area exactly equal to the threshold partially adjusts THETA and FOV by an equal amount, in response to DP. A hand area below 0.4 only adjusts THETA, a hand area above 0.6 only adjusts FOV.

FIG. 7

Figure 7:
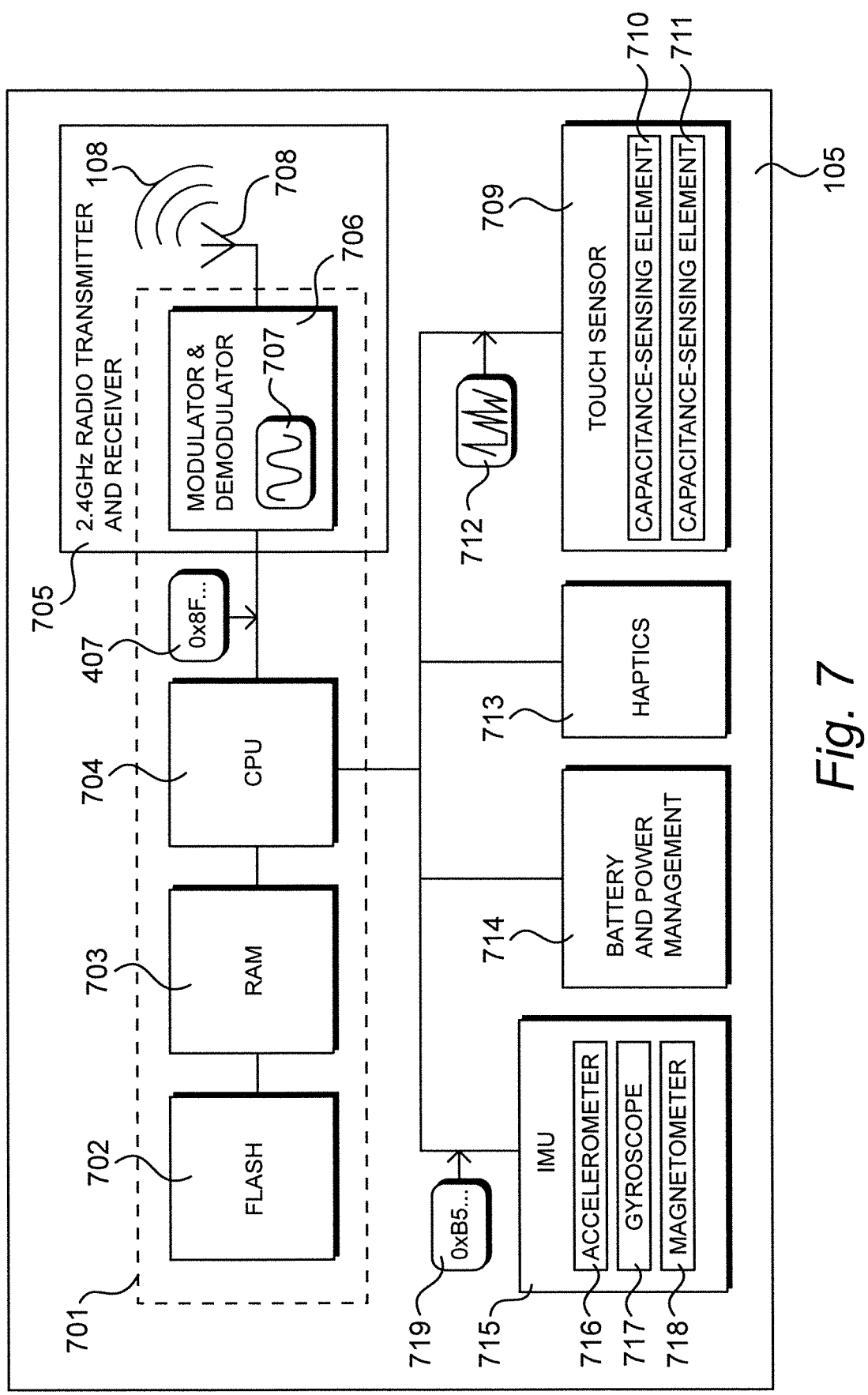
FIG. 7 details components of the input device shown in FIG. 1, including memory, a device processor and a touch sensor.

The input device 105 shown in FIG. 1 is detailed in FIG. 7. An nRF52832 System on Chip (SOC) 701 includes 512 KB of FLASH 702, 64 KB of RAM 703 and a 32-bit ARM™ Cortex™ device processor (CPU) 704. The nRF52832 is available from Nordic Semiconductor, Nordic Semiconductor ASA, P.O. Box 436, Skaøyen, 0213 Oslo, Norway. The device processor supplies gestural data 407 to a radio transmitter and receiver 705 operating in accordance with the low power Bluetooth™ 5.0 protocol. The radio transmitter and receiver 705 has a modulator and demodulator circuit 706, and circuitry for generating a carrier frequency 707 at one of several channel frequencies spaced two megahertz apart, in the range 2400 MHz to 2480 MHz. The carrier frequency 707 changes several times a second, in order to provide immunity to interference and multi-path fading. In an embodiment, a Direct Sequence Spread Spectrum (DSSS) pseudo-noise carrier is used, having a relatively large bandwidth compared to the requirements of the data being transmitted. In this case, the carrier frequency 707 is considered as the range of frequencies that result from the spreading function. The radio transmitter and receiver 705 also includes an antenna 708 that converts electrical signals representing the gestural data 407 into gestural radio signals 108.

The input device 105 also includes a touch sensor 709, including a first capacitance-sensing element 710 and a second capacitance-sensing element 711. The touch sensor 709 generates surface touch signals 712 indicative of the contacting areas 114, 115 and 116 between the input device's surface and the user's hands 106 and 107. A haptics peripheral 713 receives commands from the processing-system 111 to vibrate the input device 105 when appropriate. A battery and power management circuit 714 includes a battery and wireless charging inductors for charging the input device 105 when it is resting in the receiver 109.

A rotation-detector 715 is provided by an MPU-9250 Inertial Measurement Unit (IMU). The MPU-9250 is available from InvenSense Inc., 1745 Technology Drive, San Jose, Calif. 95110, U.S.A. The rotation-detector 715 includes a three axis accelerometer 716, a three axis gyroscope 717 and a three axis magnetometer 718. The accelerometer 316 and gyroscope 317 are each configured to generate new x-, y- and z-axis signal data at a rate of one thousand samples a second. The magnetometer generates new x-, y- and z-axis signal data at one hundred samples per second. As the user 101 rotates the input device 105, the change in orientation is converted into digital rotation-signals 719 supplied to the device processor 704, which then regularly updates an orientation quaternion at a rate of around one thousand times per second.

The device processor 704 generates the gestural data 407 by processing the surface touch signals 712 and the rotation-signals 719, and transmits new gestural data 407 to the radio transmitter and receiver 705 at a rate of one hundred and twenty times a second. The device processor 704 initially processes the surface touch signals 712 to convert them into surface touch data 408 having values over an expected range. The device processor 704 initially processes the rotation data 719 by a process of sensor fusion, to generate rotation data 409. The results of these processes are then combined to provide a packet of gestural data 407 supplied to the radio transmitter and receiver 705.

FIG. 8

Figure 8:
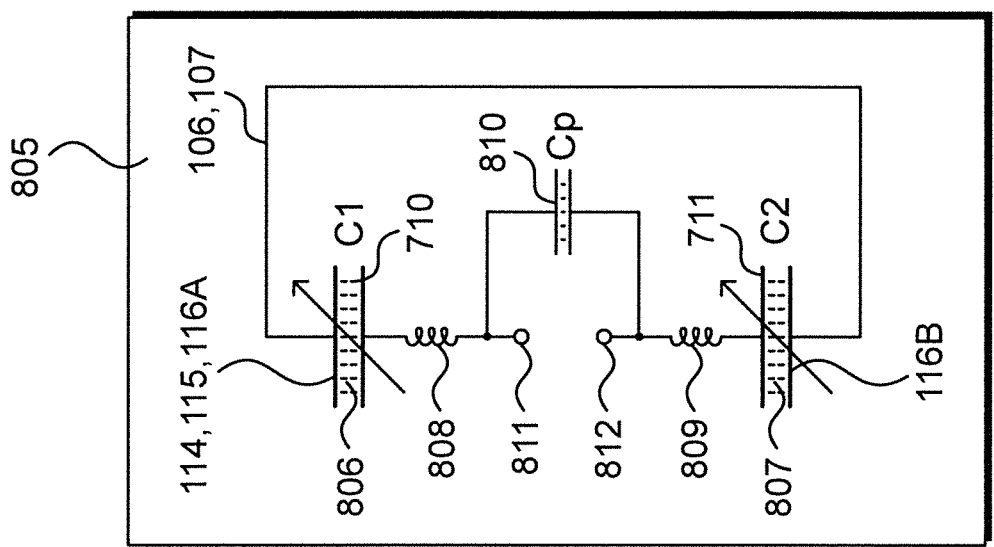
FIG. 8 details the touch sensor shown in FIG. 7.
Figure 8:
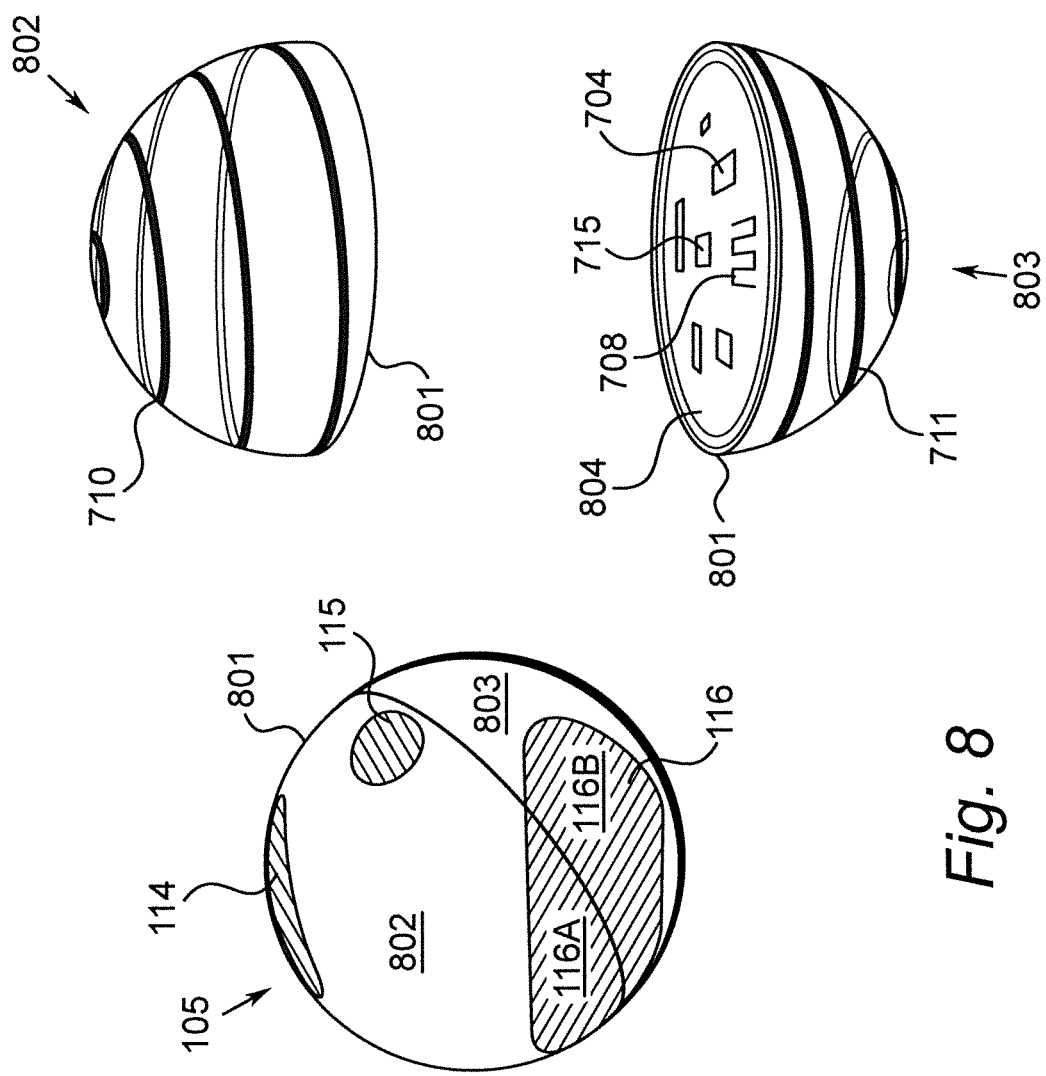

Physical construction details of the input device 105 shown in FIG. 1 are detailed in FIG. 8. The input device 105 is a manually operated apparatus that has an outer surface 801 that contains the components shown in FIG. 7. The outer surface 801 includes a first hemisphere 802 and a second hemisphere 803. In the preferred embodiment, the division into two hemispheres is made for a couple of reasons. First, to simplify manufacture and construction, and second, to logically define capacitive touch sensing as will be described. In an embodiment, only the logical division of hemispheres is used, and the physical construction of device is not divided up into approximately equal hemispheres. Furthermore, it will be appreciated that the two hemispheres may not be exact hemispheres. During normal use, the input device 105 is arbitrarily oriented as a result of rotational manipulations by the user 101.

A printed circuit board (PCB) 804 is mounted approximately at the interface between the first hemisphere 802 and the second hemisphere 803. The PCB 806 is slightly offset from the bisector of the input device 105, in order to compensate for the mass of the battery 714, which is located on the reverse side of the PCB 804. The IMU 715 is located near the center of the input device 105. The PCB 804 holds most of the components shown in FIG. 7, including the antenna 708 of the radio transmitter and receiver 705. The antenna 708 has the form of a meandered copper trace on the PCB 804, and radiates equally through both hemispheres 802 and 803.

The first hemisphere 802 provides a first area of the outer surface 801, and includes the first capacitance-sensing element 710. The touched areas 114, 115 and 116 are shown for illustrative purposes only. These occur on the first hemisphere 802 at 114, 115 and 116A. The second hemisphere 803 provides a second area of the outer surface 801, and includes the second capacitance-sensing element 711. The touched area 116 covers the second hemisphere 803 at 1168.

The first capacitance-sensing element 710 takes the form of a spiral conductor located on the inside of the outer surface 801. The outer surface 801 is made from an insulating plastic that provides electrical insulation between the capacitance-sensing element 710 and the user's hands 106 and 107. The second capacitance-sensing element 711 is similarly configured for capacitive coupling with areas of the user's hands 106 and 107 contacting or in close proximity to the second hemisphere 803. Each spiral-shaped conductor 710, 711 has the form of a conductive metallic film, vapor-deposited on the inside of the outer surface 801 during manufacture, and connect to the PCB 804.

The spiral shape of the first capacitance-sensing element 710 has a minimal surface area, much less than half the surface area of the first hemisphere 802. This allows the gestural radio signals 108 to pass through the outer surface 801 of the first hemisphere 802 with minimal attenuation. The first capacitance-sensing element 710 minimizes the Faraday cage effect with respect to the carrier frequency 707 of the gestural radio signals 108 passing through it. Radio frequency attenuation is minimized in a number of ways. Firstly, the spacing between adjacent parts of the spiral is sufficiently wide that 2.4 GHz radio waves can pass through relatively unimpeded. Secondly, adjacent parts of the spiral increase the inductance of the capacitance-sensing element 710, thereby reducing its ability to absorb the gestural-radio signals 108. Thirdly, the spiral is, in effect, a long conductor having inherent radio-frequency absorption characteristics. A spiral shape enables the length of the conductor to be maximized, further shifting its electromagnetic radio-frequency absorption characteristics away from the carrier frequency 707 of the gestural radio signals 108. As a result of these features, the first capacitance-sensing element 710 may be considered as being substantially transparent to the gestural radio signals 108. Furthermore, the spiral shape substantially encloses the volume of the first hemisphere 802, ensuring that relatively homogeneous capacitive coupling is provided between the capacitance-sensing element 710 and adjacent areas of the user's hands 106, 107, such as areas 114, 115 and 116A. In practice, the capacitive coupling is sufficiently homogeneous over the first hemisphere 802 that the user is unaware of any variations in surface touch sensitivity due to the gaps between adjacent parts of the spiral 710. The second capacitance-sensing element 711 is similarly configured to be radio transparent to the gestural radio signals 108 passing through it.

When the user's hands 106 and 107 cover a significant area of the outer surface 108, it is important that the remaining uncovered areas allow the gestural radio signals 108 to pass through without significant attenuation. Without such a design, attenuation will reduce the maximum distance between the device 105 and the receiver 109 over which the gestural radio signals 108 can be reliably transmitted, resulting in drop-outs that are noticeable to the user 101 while navigating the virtual environment 102.

Homogeneous touch detection across the surface of the input device 105 is provided by a non-homogeneous touch sensor comprising the two capacitance-sensing elements 710 and 711. The first capacitance-sensing element 710 is arranged to establish a first variable capacitance, C1 806 with a first area 114, 115, 116A of the user's hands through the first hemisphere 802 of the outer surface 801. The first variable capacitance increases with the total area of the user's hands in close proximity to the first capacitance-sensing element 710. Similarly, the second capacitance-sensing element 711 is arranged to establish a second variable capacitance, C2, 807 with a second area 1168 of the user's hands through the second hemisphere 803 of the outer surface 801. The user's hands 106 and 107 effectively form a closed circuit between the two variable capacitances 806 and 807, connecting them in series. The series connection occurs whether one or both hands are used to manipulate the device. This series connection between the variable capacitances 806 and 807 provides a touch-responsive capacitance 805 indicative of the combined area 114, 115 and 116 of the user's hands 106, 107 touching or in close proximity to the outer surface 801.

Both capacitance-sensing elements 710 and 711 substantially enclose their respective hemispheres 802 and 803, activating their surfaces for homogeneous touch sensing. As long as each hemisphere 802, 803 is covered by at least some part of the user's hands, the series combination of C1 and C2 provides a usable indication of the total area of the user's hands covering the input device 105. In practice, it is very difficult to hold the input device 105 without at least partially covering some of both hemispheres. Therefore the limitation that both hemispheres must be touched, is never encountered during normal use. Counter-intuitively, the touch-responsive capacitance 805 provides a good measure of the total area of contact 114, 115, 116, even when the input device 105 has been rotated arbitrarily, and when a user's hands cover the two hemispheres 802 and 803 by different amounts.

The first capacitance-sensing element 710 includes an inductance 808 that is distributed over its length. This cannot be drawn using standard electrical symbols, and so the schematic of FIG. 8 shows the inductance 808 in series with the first variable capacitance 806. Similarly, the second capacitance-sensing element 711 includes a distributed inductance 809. The inductances are only relevant at radio frequencies, and are small enough not to affect capacitance measurements performed by the touch sensor 709. Thus, each capacitance-sensing element 710 and 711 includes an inductive portion for minimizing attenuation of the gestural radio signals 108.

A fixed capacitance Cp 810 also exists between the two capacitance-sensing elements 710 and 711, by virtue of their physical proximity and connections on the PCB 804. The touch responsive capacitance 805 is measured at terminals 811 and 812. In the preferred embodiment, the second terminal 812 is connected to the electrical ground of the PCB 804.

FIG. 9

Figure 9:
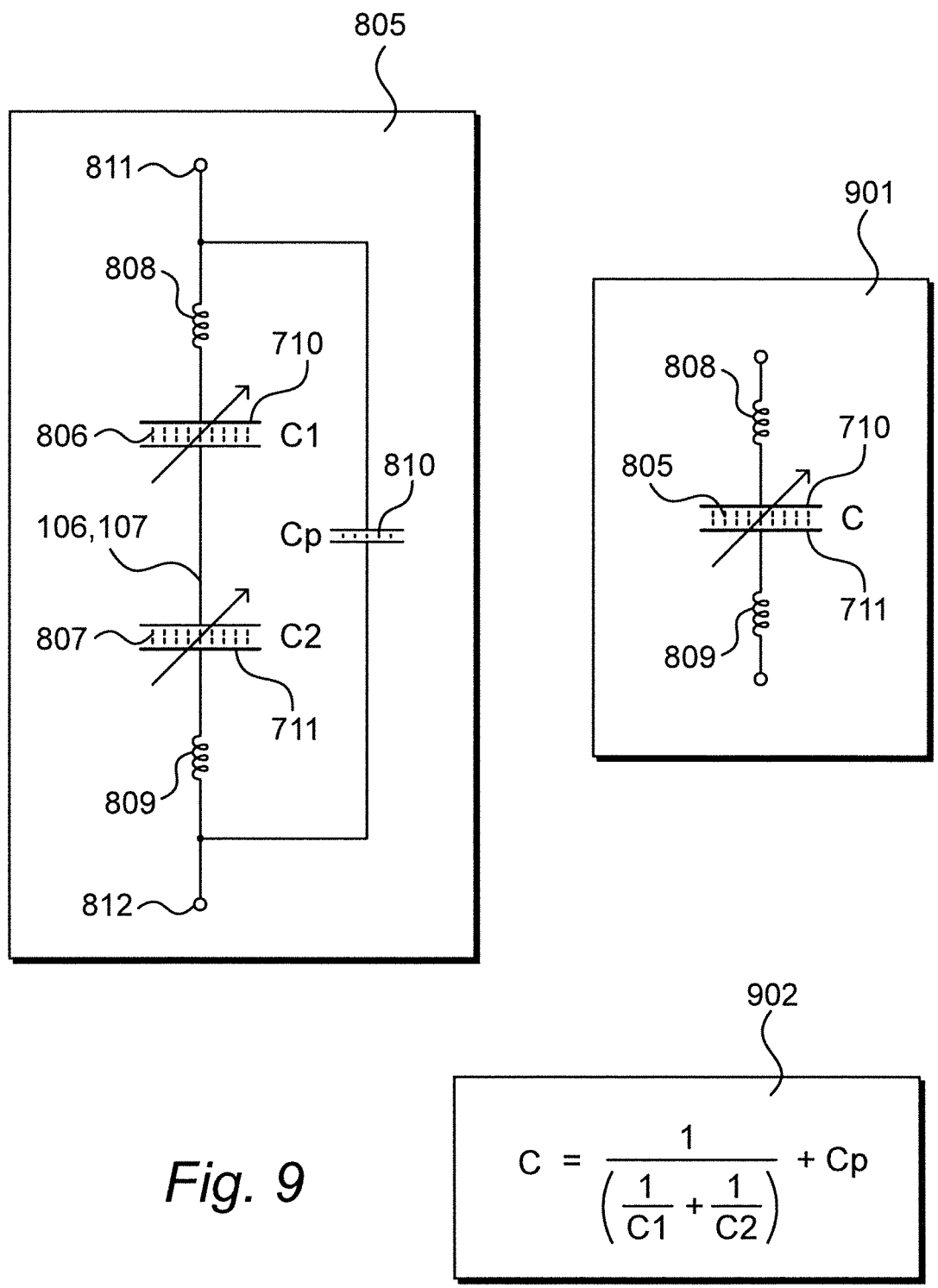
FIG. 9 further details the touch sensor shown in FIG. 7.

The touch-responsive capacitance 805 shown in FIG. 8 is detailed in a transposed form in FIG. 9, in order to clarify its characteristics. The combination of the series and parallel capacitances, along with their distributed inductances, may be summarized as shown at 901, with the touch-responsive capacitance C 805 being shown as a single capacitor. At 902, an equation is shown that combines the series-connected variable capacitances C1 806 and C2 807 with the fixed parallel capacitance Cp 810, to define the touch-responsive capacitance C 805. The touch-responsive capacitance 805, varies between about seventeen picofarads and twenty picofarads, corresponding to a range of conditions between no touch at all and both hands fully covering the outer surface 801. During manufacture, this range is calibrated, and a normalized range between zero and one is obtained in response to measurements of the touch-responsive capacitance between terminals 811 and 812.

The touch sensor 709 gives similar output regardless the orientation of the input device 105. This immunity to orientation may be understood in the following way and with reference to the capacitance equation 902. In any orientation of the input device 105, it is natural for the user 101 to manually rotate the input device 105 with a significant area of fingertips or palms touching the first hemisphere 802 and the second hemisphere 803. In an uneven distribution of the same area across the two hemispheres 802 and 803, the first variable capacitance 806 is increased, and the second variable capacitance 807 is correspondingly decreased. Although the value of C, given by the capacitance equation 902, changes somewhat as a result of this new distribution, the difference does not have a significant effect on gesture interpretation in terms of the experience of the user 101.

FIG. 10

Figure 10:
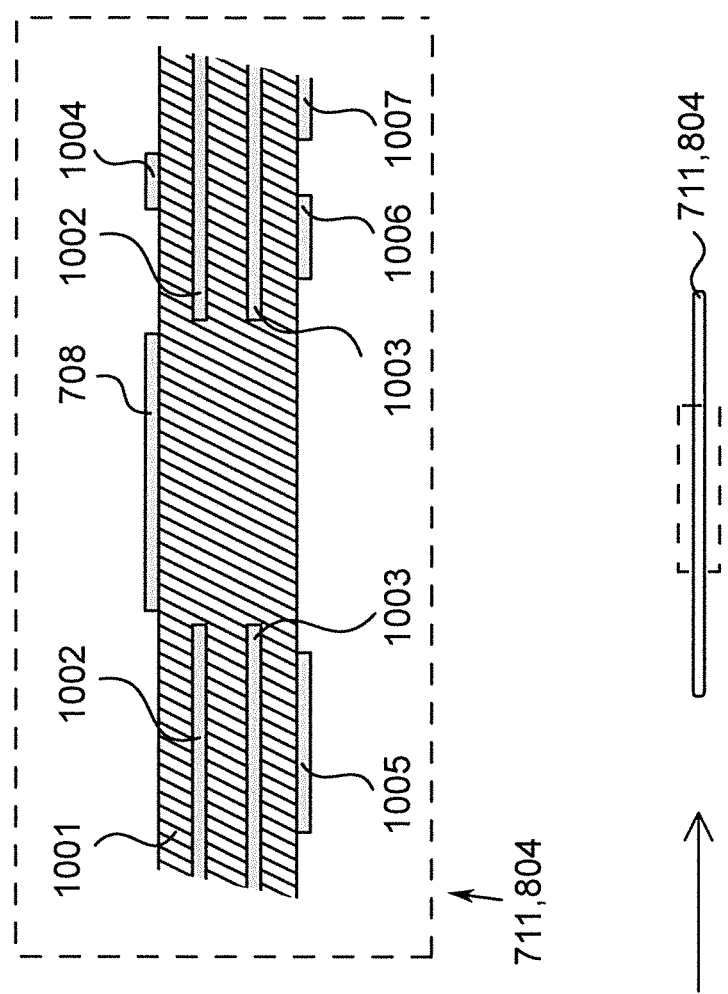
FIG. 10 shows an alternative embodiment of the touch sensor shown in FIG. 7.
Figure 10:
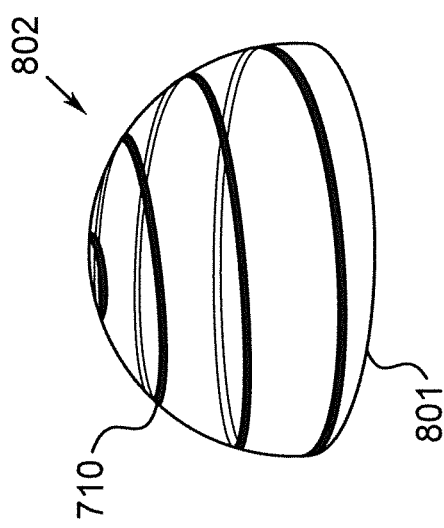
Figure 10:
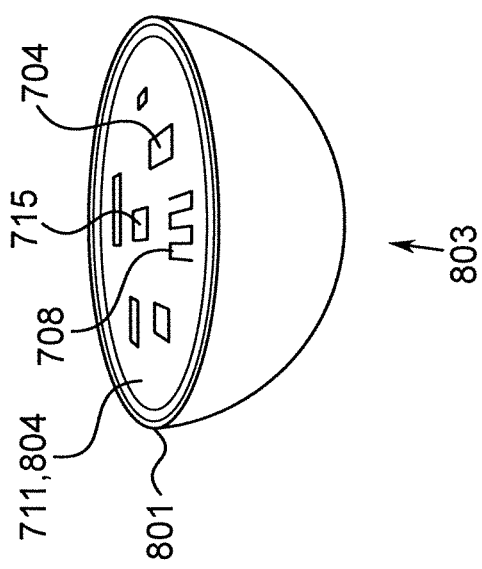

In an embodiment, the second capacitance-sensing element 711 takes the form of fixed-voltage planes on the PCB 804, as detailed in FIG. 10. The PCB 804 has four copper layers in a fiberglass substrate 1001. The two inner layers include a 1.8V power distribution layer 1002 and a 0V power distribution layer 1003. The power distribution layers 1002 and 1003 are formed of continuous copper planes that extend over the entire area of the PCB 804, with the exception of the area near the antenna 708. The PCB also includes outer layers that provide digital and analogue signal connections 1004, 1005, 1006 and 1007. The second capacitance-sensing element is provided primarily by the lower power plane 1003, which establishes a capacitance with any area of the user's hands 106, 107 that cover the second hemisphere 803. The capacitive coupling between the second capacitance-sensing element 711 and the user's hands 106, 107 is lower, compared to the embodiment shown in FIG. 8, leading to a reduced signal-to-noise ratio and greater non-linearity in touch detection. However, construction is simplified, and there is nothing to attenuate the gestural radio signals 108 as they pass through the outer surface of the second hemisphere 803.

The antenna 708 requires an interruption to the otherwise continuous area of the power planes 1002 and 1003. However, the antenna itself, from a capacitance-sensing perspective, may be held at a low impedance during capacitance sensing, and thereby form part of the second capacitance-sensing element 711. Transmission at a frequency of 2.4 GHz is at such a high frequency, that, in effect, the actively transmitting antenna 708 becomes a functional part of the second capacitance-sensing element 711, and gestural radio signals 108 are, in effect, transmitted from part of the second capacitance-sensing element 711.

Capacitance measurements made by the touch sensor 709 are synchronized to occur only when the antenna 708 is in a low impedance state, such as when it is transmitting. This avoids interference with radio reception by the charging and discharging cycles used to measure the touch-responsive capacitance 805.

FIG. 11

Figure 11:
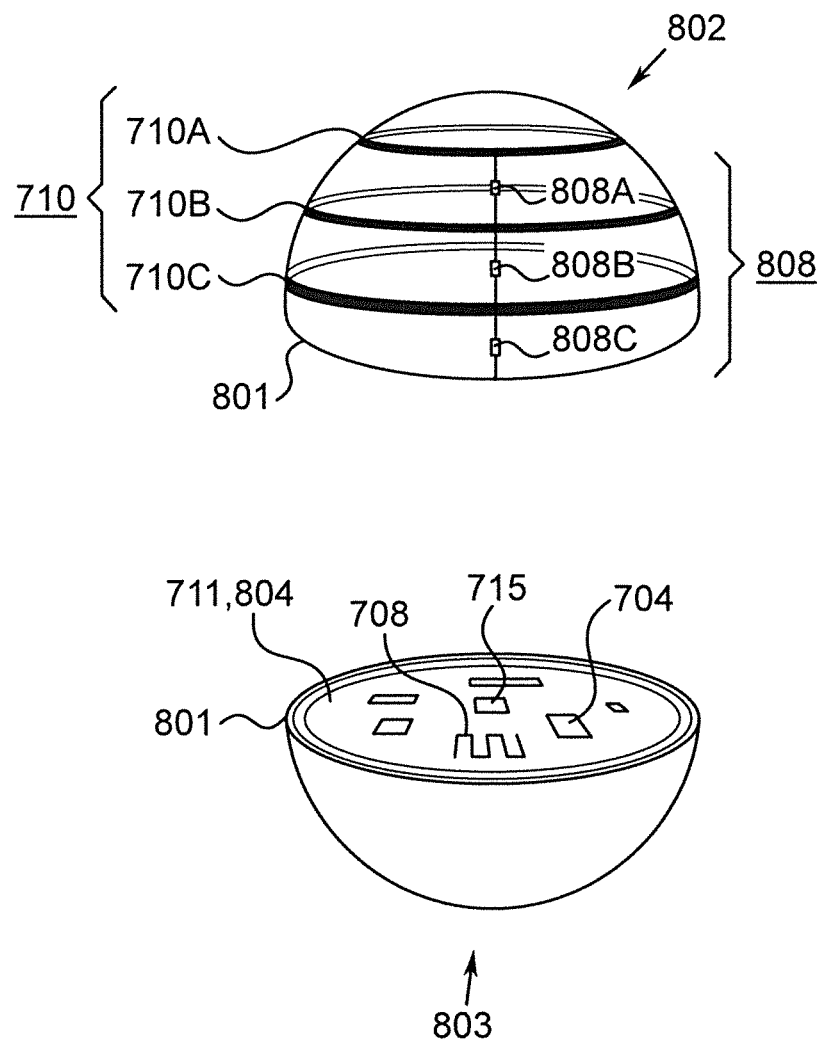
FIG. 11 shows an additional alternative embodiment of the touch sensor shown in FIG. 7.

A further embodiment is shown in FIG. 11. The first capacitance-sensing element 710 comprises three circular conductors 710A, 710B and 710C. These are electrically connected by three inductors 808A, 808B and 808C. Inductor 808C connects the capacitance-sensing element 710 to the PCB 804. The inductors 808A, 808B and 808C facilitate a degree of electrical isolation between the three circular conductors 710A, 710B, 710C and the circuit board 804, thereby reducing the Faraday cage effect with respect to the gestural radio signals 108 passing through them. Inductor 808C has a self-resonant frequency by virtue of its self-capacitance. Its self-resonant frequency is slightly offset from the carrier frequency 707, thereby maximizing its insulating effect with respect to the carrier frequency of the gestural radio signals 108. Inductors 808A and 8088 are similarly configured. The inductors 808A, 808B, 808C may be considered as providing inductive portions, with each inductive portion forming a tuned circuit with its own self-capacitance, giving a self-resonant frequency of each inductive portion that is close to, but not identical with, the carrier frequency 707 of the gestural radio signals 108. The second capacitance-sensing element 711 is provided by conductive traces in the PCB 804, as shown in FIG. 10.

FIG. 12

Figure 12:
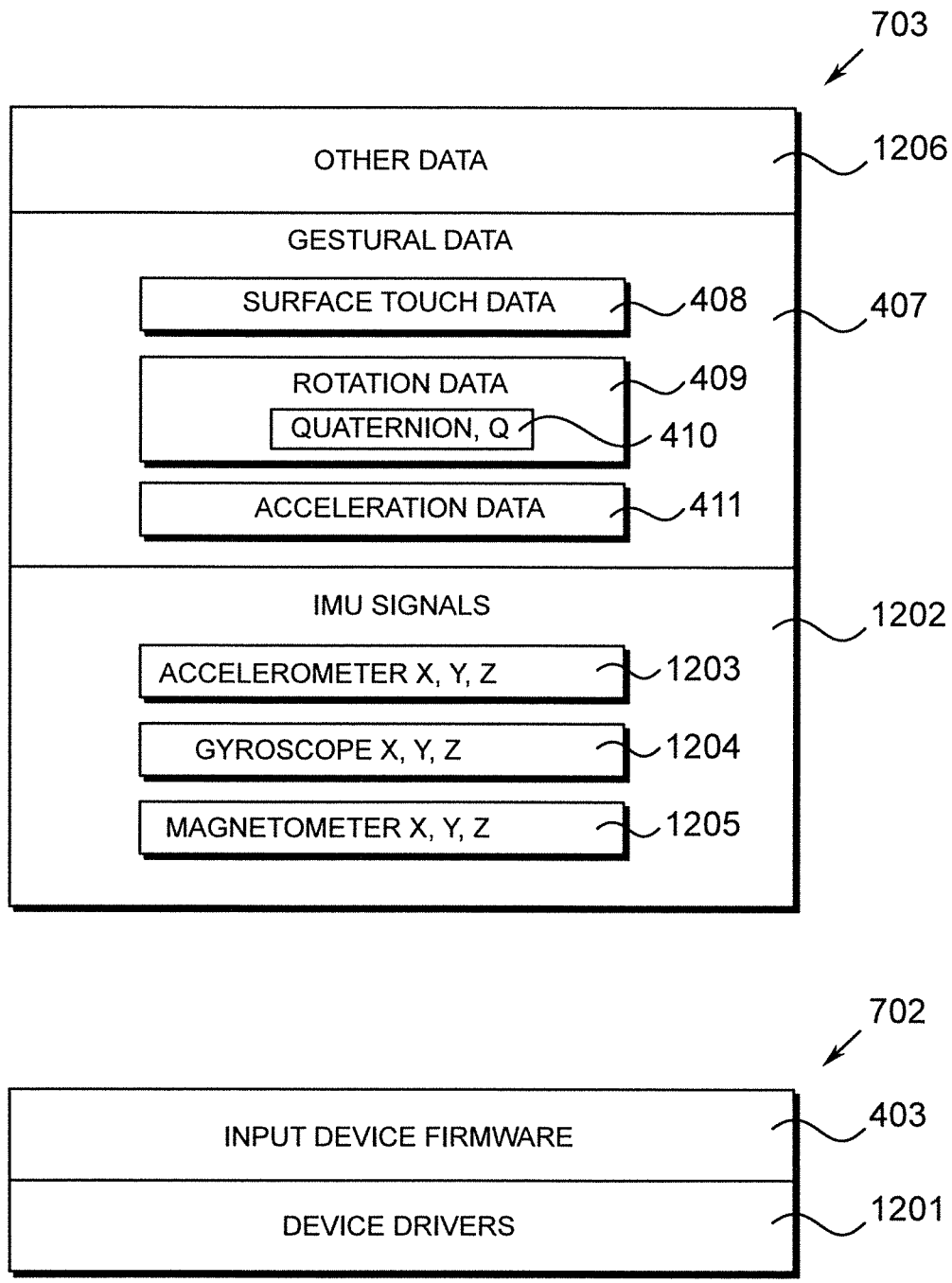
FIG. 12 details the contents of memory shown in FIG. 7.

Contents of input device RAM 703 and FLASH 702 during its operation are detailed in FIG. 12. Device drivers 1201 include instructions to enable the device processor 704 to communicate with the radio 705, touch sensor 709, haptics circuit 713, battery and power management circuit 714, and IMU 715. The FLASH memory 703 also includes the input device firmware instructions 403.

Input device RAM 703 includes IMU signals 1202 comprising triple-axis accelerometer data samples 1203, triple-axis gyroscope data samples 1204 and triple-axis magnetometer data samples 1205. The input device 105 generates gestural data 407 by executing the input device firmware instructions 403 on the device processor 704. The gestural data 407 includes surface touch data 408, rotation data 409 including the quaternion, Q, 410, and acceleration data 411. Other data 1206 includes temporary variables used during the generation of the gestural data 407.

FIG. 13

Figure 13:
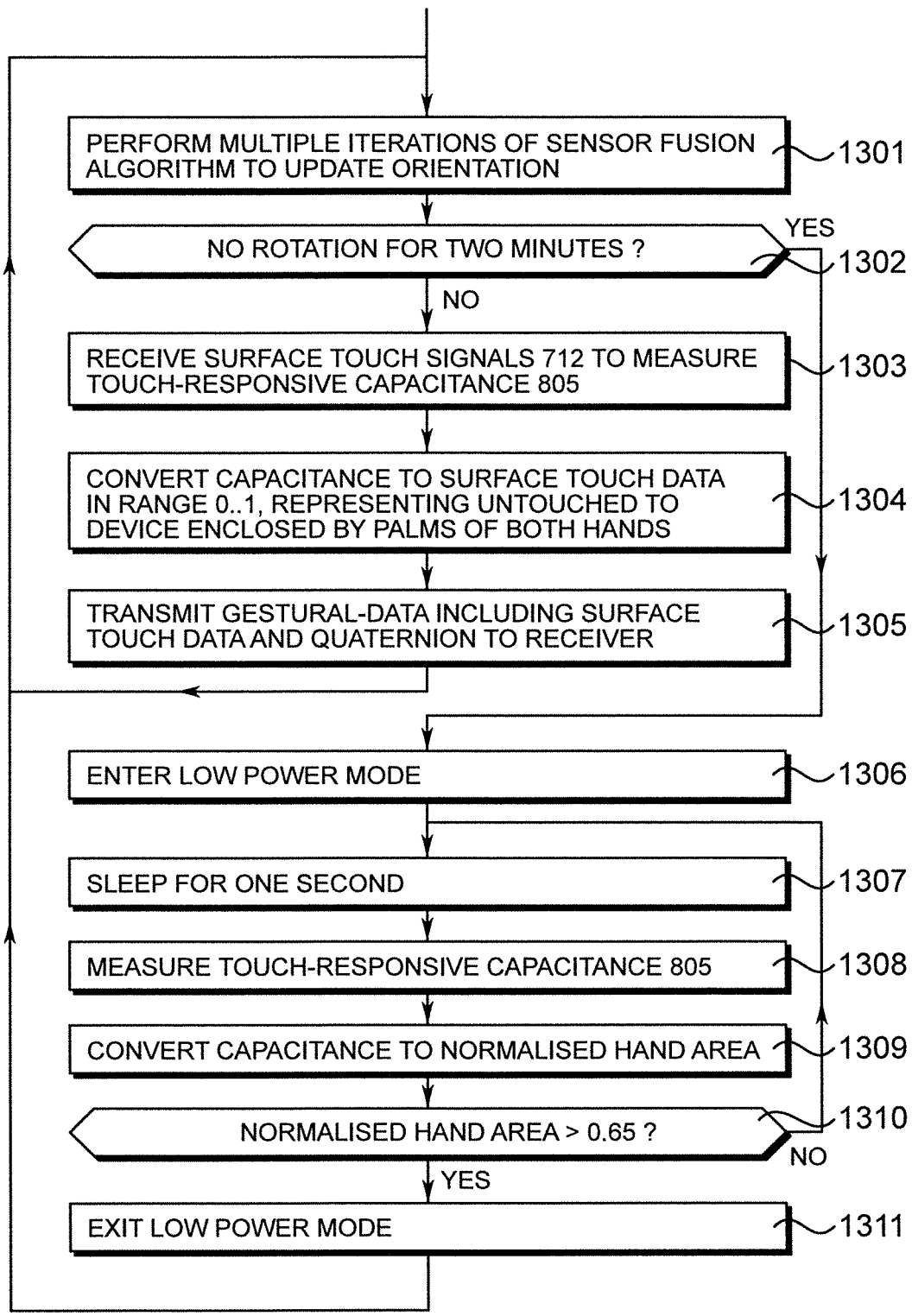
FIG. 13 shows the steps performed by the device processor shown in FIG. 7.

The steps performed by the device processor 704 while executing the input device firmware instructions 403 shown in FIG. 12, are detailed in FIG. 13. At step 1301 multiple iterations of a sensor fusion algorithm are performed on signals 1202 from the IMU 715. The results are stored as rotation data 409 and acceleration data 411. Sensor fusion is performed using Sebastian Madgewick's sensor fusion algorithm, available at http://x-io.co.uk/open-source-imu-and-ahrs-algorithms. Each time step 1301 is performed, the orientation quaternion 410 is incrementally modified, so that, after a short period of initialization, it continuously tracks the orientation of the input device 105 with respect to the Earth's gravitational and geomagnetic fields.

At step 1302 a question is asked as to whether there has been no rotation of the input device 105 for two minutes. This period of inactivity can be detected by analyzing the rotation data 409. The analysis includes measuring change magnitudes in the components of the orientation quaternion 410. If none of the quaternion's four components changes by more than 0.05 in each eight millisecond interval for two minutes, the question asked at step 1302 is answered in the affirmative. The input device 105 is then considered as being not in use, and control is directed to step 1306 to deactivate it. Alternatively, if significant rotations have occurred, the input device 105 is considered as being in use, and control is directed to step 1303.

At step 1303 the touch-responsive capacitance C 805 is measured by receiving the surface touch signals 712. The surface touch signals 712 include charge currents developed in response to the touch-responsive capacitance 805, which varies in accordance with the first variable capacitance C1 806 in series with the second variable capacitance C2 807. A Capacitance-to-Digital-Converter (CDC) for measuring capacitance is built in to the SOC 701. The CDC generates a single value proportional to the touch-responsive capacitance 805. Eight such CDC measurements are made, and then averaged, to reduce noise. At step 1304 the CDC value is converted into a floating point value by subtracting an offset and multiplying by a scaling factor. The offset removes the effect of the parasitic capacitance Cp 810, and the scaling factor normalizes the remaining capacitance range of about three picofarads to a range of zero to one. The surface touch data 408 is updated with this value. When the surface touch data 408 takes a value of zero, this corresponds to a contacting hand area of zero. When the surface touch data 408 takes a value of one, this corresponds to the maximum touched area formed by enclosing the input device 105 in the palms of both hands 106 and 107.

The surface touch data 408, rotation data 409, and acceleration data 411 are combined into gestural data 407 and supplied to the radio 705 at step 1305. The radio 705 then transmits the gestural data 407 to the receiver 109. Control is then directed to step 1301, and steps 1301 to 1305 are repeated one hundred and twenty times per second for as long as the input device 105 is in use.

When the input device 105 is not in use, control is directed to step 1306, where the device processor 704, and other components shown in FIG. 7, are put into a low power mode. During the low power mode, power consumption is reduced to a few microamps. At step 1307, the device processor 704 sleeps for one second. At step 1308 the device processor 704 activates enough of its circuitry to measure the touch-responsive capacitance 805. At step 1309 the measured capacitance is converted into a normalized hand area value. At step 1310 the hand area is compared with an activation threshold of 0.65. This value corresponds to a touch-responsive capacitance that occurs during an activation gesture of enclosing the input device 105 between both hands. If the hand area is less than the activation threshold, control is directed back to step 1307, where the device processor 704 sleeps for another second before performing another measurement of the touch-responsive capacitance 805. Alternatively, if a large enough hand area is detected, at step 1311 the device processor 704 and other components of the input device 105 are instructed to exit the low power mode, and control is directed back to step 1301.

The steps of FIG. 13 show how the input device 105 generates a stream of gestural data 407 for the external processing system 111. Also shown, is the mechanism for activating and deactivating the input device 105, which is necessary because there is no suitable location for a conventional switch or on/off button. Alternative switching mechanisms are ineffective. For example, if the accelerometer 716 is used to activate the input device 105 in response to a sharp tap, problems will occur when the device receives ordinary knocks and movements during transportation. By comparison, the increase in capacitance caused by enclosure between the palms of both hands cannot occur unless done deliberately. Periodically measuring the touch-responsive capacitance 805 provides a reliable and low power method for activating the input device 105.

FIG. 14

Figure 14:
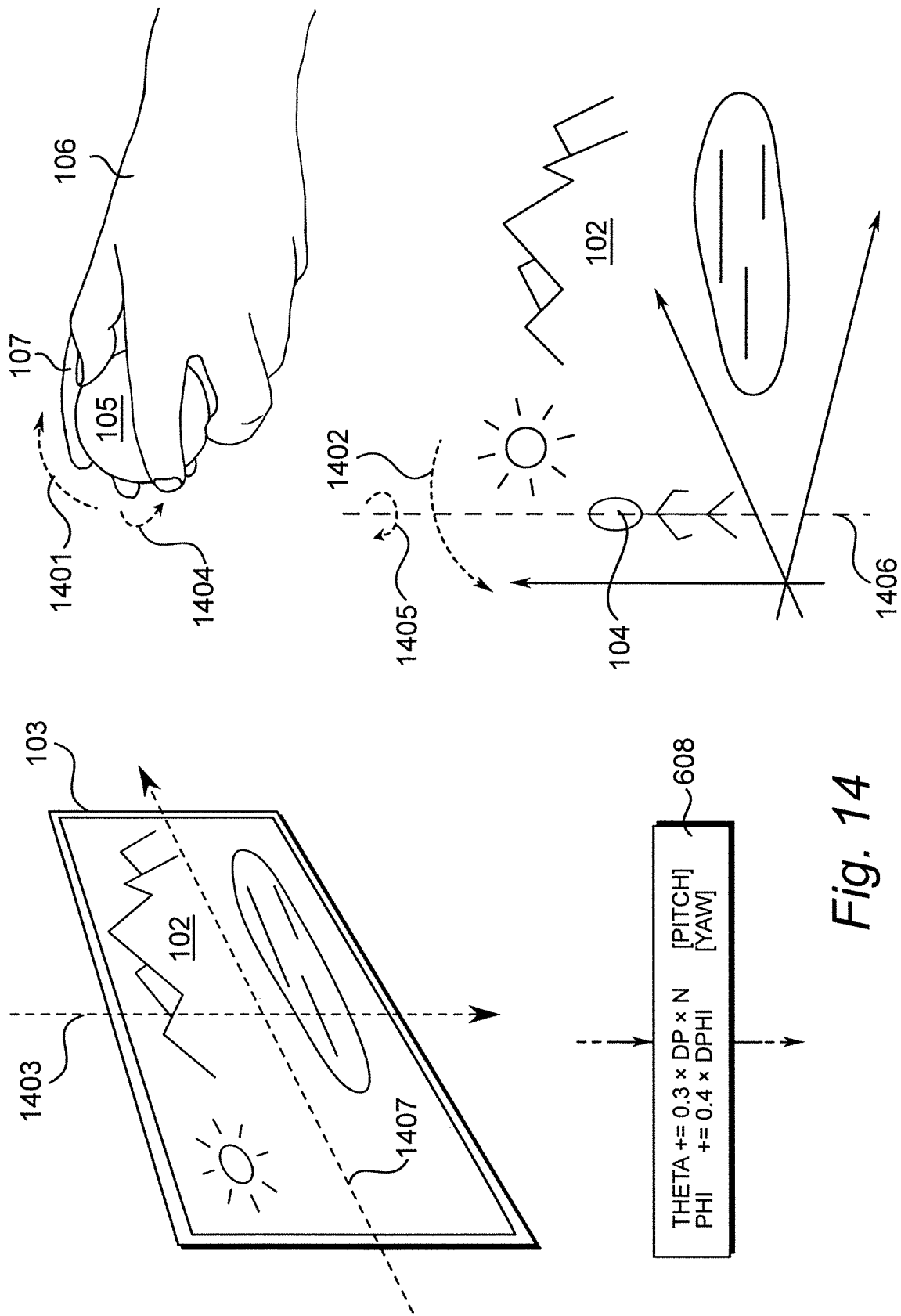
FIG. 14 shows orientation gestures performed using the system shown in FIG. 1.

Operation of the input device 105 using fingertip manipulation is shown in FIG. 14. The input device 105 is rotated with the fingertips of one or both of the user's hands 106, 107. The pitch rotation of the input device 105 can be adjusted about an imaginary horizontal axis extending from the user's left to the user's right. A backwards pitch rotation 1401 results in a corresponding change in pitch 1402 of the user's viewpoint 104 in the virtual environment 102. This results in a downward shift 1403 of the environment 102 shown on the display 103. This gives the user 101 the sensation of looking up.

Similarly, the device 105 can be yaw rotated about an imaginary vertical axis. A clockwise yaw rotation 1404 results in a corresponding yaw rotation 1405 of the user's viewpoint 104 about a vertical axis 1406 in the virtual environment 102. This results in a horizontal shift 1407 of the environment shown on the display 103. This gives the user 101 the sensation of looking to the left. Relevant calculations performed at step 608 in FIG. 6 are highlighted in FIG. 14.

FIG. 15

A user gesture for adjusting the field-of-view (FOV) 415 is shown in FIG. 15. The user 101 manipulates the input device 105 by enclosing it between the left hand 106 and right hand 107 so that the area of the user's hands touching or in close proximity to the surface of the device 105 exceeds the threshold 418 of half its surface area. The user 101 imparts a rotation 1501 to the user's forearms 1502 and 1503 about an imaginary axis 1504 that passes between the user's elbows 1505 and 1506. The rotation 1501 about the elbow axis 1504 results in a pitch rotation 1507 of the input device 105 about its center, which is measured by the IMU 715 and translated into a negative DP value at step 604 in FIG. 6. The DP value provides an indication of the change in angle of rotation of one or both of the user's forearms 1502, 1503 with respect to the rotation axis 1504 between the user's elbows 1505 and 1506. The combination of the device's pitch rotation 1507 and the surface area of the user's hands exceeding the threshold 418, results in the field-of-view 415 being modified at step 608. This causes the new field-of-view 1508 of the virtual environment 102 to be expanded to fit the display 103, which is then viewed by the user 101, who perceives a zoom in effect.

In the case of the gesture shown in FIG. 15, the pitch rotation value DP is negative, resulting in a reduction in the field-of-view 415 in accordance with the calculations performed at step 608 of FIG. 6. The reduction in the field-of-view 415 value results in the reduced area 1508 of the virtual environment 102 being expanded to fit the display 103. Symbolically, the user 101 perceives that they have grabbed part of the environment 102 by enclosing the input device 105 with their hands, and that they are pulling the environment 102 towards them. The relevant field-of-view calculation performed at step 608 in FIG. 6 is highlighted in FIG. 15. The field-of-view calculation 608 is scaled by a factor of about one third, to provide an optimal sense of connection between the gesture of rotationally moving the input device 105 towards the user 101 and pulling the environment 102 towards the user 101. The user 101 may perform the gesture using one or both hands. In the case of one-handed manipulation of the input device 105, only one of the user's forearms 1502 or 1503 is rotated to perform the zoom gesture.

The zoom gesture requires the input device 105 to be significantly covered by one or both of the user's hands 106, 107, resulting in considerable reduction in the available surface through which the gestural radio signals 108 can pass. This further emphasizes the need for a capacitive touch sensor 709 that can operate without attenuating the gestural radio signals 108 that pass through it.

What we claimed is:

1. An apparatus for data input, comprising:
   a substantially spherical touch-sensitive outer surface arranged to be supported within the hands of a user;
   a capacitive touch sensor, including a plurality of capacitance-sensing elements configured to generate surface touch signals in response to a touch-responsive capacitance including a first variable capacitance in series with a second variable capacitance;
   a first said capacitance-sensing element arranged to establish said first variable capacitance with a first area of said user's hands through a first hemisphere of said outer surface;
   a second said capacitance-sensing element arranged to establish said second variable capacitance with a second area of said user's hands through a respective second hemisphere of said outer surface;
   an inertial measurement unit arranged to generate rotation signals in response to rotational manipulations of said outer surface by said user;
   a device processor for generating gestural data in response to said surface touch signals with said rotation signals; and
   a radio transmitter for generating gestural radio signals from said gestural data and transmitting said gestural radio signals through said outer surface.

2. The apparatus of claim 1, wherein said first capacitance-sensing element is substantially transparent to said gestural radio signals.

3. The apparatus of claim 2, wherein said first capacitance-sensing element has a surface area equal to less than half the surface area of said first hemisphere.

4. The apparatus of claim 1 or claim 2, wherein said first capacitance-sensing element is a spiral-shaped conductor.

5. The apparatus of claim 4, wherein said spiral-shaped conductor substantially encloses the volume of said first hemisphere.

6. The apparatus of claim 5, wherein said second capacitance-sensing element is a spiral-shaped conductor that substantially encloses the volume of said second hemisphere.

7. The apparatus of claim 1, wherein said second capacitance-sensing element includes at least one conductive plane of a circuit board.

8. The apparatus of claim 1, wherein said second capacitance-sensing element includes an antenna of said radio transmitter.

9. The apparatus of claim 1, wherein:
   said second capacitance-sensing element includes at least one conductive plane of a circuit board, and
   said second capacitance-sensing element includes an antenna of said radio transmitter.

10. The apparatus of claim 2, wherein said second capacitance-sensing element is substantially transparent to said gestural radio signals.

11. The apparatus of claim 2, wherein said first capacitance-sensing element includes an inductive portion for minimizing attenuation of said gestural radio signals.

12. The apparatus of claim 11, wherein said second capacitance-sensing element includes an inductive portion for minimizing attenuation of said gestural radio signals.

13. The apparatus of claim 11, wherein said inductive portions form part of a tuned circuit having a resonant frequency close to a carrier frequency of said gestural radio signals.

14. The apparatus of claim 11, wherein said device processor is configured to generate rotation indications in said gestural data by a process of sensor fusion.

15. A method of inputting data using a substantially spherical outer surface supported within the hands of a user, said outer surface enclosing a touch sensor, an inertial measurement unit, a device processor and a radio transmitter, the method comprising the steps of:
   forming a first variable capacitance between a first capacitance-sensing element of said touch sensor and a first area of said user's hands through a first hemisphere of said outer surface;
   forming a second variable capacitance between a second capacitance-sensing element of said touch sensor and a second area of said user's hands through a respective second hemisphere of said outer surface;
   measuring a touch-responsive capacitance that includes said first variable capacitance in series with said second variable capacitance, to generate surface touch signals;
   generating rotation signals in response to a rotational manipulation of said outer surface detected by said inertial measurement unit;
   processing said surface touch signals with said rotation signals to generate gestural data;
   supplying said gestural data to said radio transmitter to generate gestural radio signals; and
   transmitting said gestural radio signals through said outer surface.

16. The method of claim 15, wherein said transmitting step includes transmitting said gestural radio signals through said first capacitance-sensing element.

17. The method of claim 16, wherein said transmitting step includes transmitting said gestural radio signals through said second capacitance-sensing element.

18. The method of claim 16, wherein said transmitting step includes transmitting said gestural radio signals through a spiral-shaped conductor substantially enclosing said first hemisphere, and said first capacitance-sensing element is said spiral-shaped conductor.

19. The method of claim 15, wherein said transmitting step includes transmitting said gestural radio signals from a said capacitance-sensing element.

20. A method of updating a virtual environment using a substantially spherical input device having an outer surface supported within the hands of a user, comprising the steps of:
   forming a first variable capacitance between a first capacitance-sensing element and a first area of said user's hands through a first hemisphere of said outer surface;
   forming a second variable capacitance between a second capacitance-sensing element and a second area of said user's hands through a respective second hemisphere of said outer surface;

measuring a touch-responsive capacitance indicative of the area of said user's hands contacting said outer surface that includes said first variable capacitance in series with said second variable capacitance;

comparing an indication of said area of said user's hands contacting said outer surface with a threshold to provide a comparison;

analyzing a rotational manipulation of said outer surface to generate a rotation indication; and processing said comparison with said rotation indication to update a virtual environment.

\* \* \* \* \*